(12) United States Patent
Yoshiki et al.

(10) Patent No.: US 6,595,171 B2
(45) Date of Patent: Jul. 22, 2003

(54) VALVE TIMING CONTROL SYSTEM FOR INTERNAL COMBUSTION ENGINE

(75) Inventors: Koichi Yoshiki, Saitama-ken (JP); Tomoya Furukawa, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/218,663

(22) Filed: Aug. 15, 2002

(65) Prior Publication Data

US 2003/0033997 A1 Feb. 20, 2003

(30) Foreign Application Priority Data

Aug. 20, 2001 (JP) ........................................ 2001-249311

(51) Int. Cl.[7] .................................................. F01L 1/34
(52) U.S. Cl. ................................ 123/90.15; 123/90.16; 123/90.17; 123/90.31
(58) Field of Search .......................... 123/90.15, 90.16, 123/90.17, 90.27, 90.31

(56) References Cited

U.S. PATENT DOCUMENTS

| | | | | |
|---|---|---|---|---|
| 5,713,317 A | * | 2/1998 | Yoshioka | 123/90.15 |
| 6,109,224 A | * | 8/2000 | Morikawa et al. | 123/90.15 |
| 6,341,586 B2 | * | 1/2002 | Tachibana et al. | 123/90.15 |

FOREIGN PATENT DOCUMENTS

JP  2001173472 A  *  6/2001  ........... F02D/13/02

* cited by examiner

Primary Examiner—Thomas Denion
Assistant Examiner—Ching Chang
(74) Attorney, Agent, or Firm—Arent Fox Kintner Plotkin & Kahn, PLLC

(57) ABSTRACT

There is provided a valve timing control system for an internal combustion engine, which is capable of properly controlling valve timing while maintaining the accuracy of degradation determination of an oxygen concentration sensor or an exhaust gas-purifying device. The valve timing control system for an internal combustion engine includes a degradation-determining system that performs degradation determination of at least one of the oxygen concentration sensor and the exhaust gas-purifying device in a state in which the air-fuel ratio of a mixture supplied to the engine is controlled to a predetermined state, and controls valve timing by changing the cam phase. An ECU determines whether or not executing conditions for the degradation determination by the degradation-determining system are satisfied. When it is determined that the executing conditions for the degradation determination are satisfied, a change in setting of the target cam phase, which is to be executed in dependence on operating conditions of the engine, is restricted.

3 Claims, 4 Drawing Sheets

VALVE TIMING CONTROL SYSTEM FOR INTERNAL COMBUSTION ENGINE

BACKGROUND OF THE INVENTION

1. Field of the Invention

This invention relates to a valve timing control system for an internal combustion engine, which varies the cam phase of at least one of an intake cam and an exhaust cam, relative to a crankshaft of the engine, to thereby control valve timing, and more particularly to a valve timing control system which is used together with a deterioration-determining system for performing degradation determination of at least one of an oxygen concentration sensor and an exhaust gas-purifying device.

2. Description of the Prior Art

Conventionally, a valve timing control system of the above-mentioned kind was proposed e.g. in Japanese Laid-Open Patent Publication (Kokai) No. 9-217609. In this control system, a cam phase change mechanism supplied with hydraulic pressure controlled by an hydraulic pressure control valve changes the cam phase by changing the angle of a camshaft relative to a cam pulley. Further, a target cam phase is set depending on operating conditions of an internal combustion engine, e.g. on rotational speed of the engine and load thereon, and at the same time, the control system controls the cam phase such that an actual cam phase becomes equal to the target cam phase. This varies a valve overlap between an intake valve and an exhaust valve, thereby ensuring charging efficiency and internal EGR suitable for the operating conditions of the engine.

Further, some of the recent internal combustion engines include a degradation-determining system for performing degradation determination of an oxygen concentration sensor or an exhaust gas-purifying device. For example, Japanese Laid-Open Patent Publication (Kokai) No. 8-121221 discloses one of such conventional degradation-determining systems for an oxygen concentration sensor. This oxygen concentration sensor is arranged in an exhaust manifold connected to cylinders, and the degradation-determining system sets fuel injection amounts for the cylinders to respective fixed values such that the air-fuel ratio of a mixture supplied to at least one of the cylinders is different from those of mixtures supplied to the other cylinders, over a predetermined time period, in a steady operating condition of the engine in which the engine rotational speed and the intake air amount are constant. A waveform variation of the air-fuel ratio and a waveform variation of output from the oxygen concentration sensor caused by those fuel injection amounts during the predetermined time period are compared with each other, whereby the degradation of the oxygen concentration sensor is determined.

Further, for example, Japanese Laid-Open Patent Publication (Kokai) No. 2000-328929 discloses one of such degradation-determining systems for an exhaust gas-purifying device. This exhaust gas-purifying device is comprised of a linear-type oxygen concentration sensor, a three-way catalyst, a first oxygen concentration sensor of a binary type, a NOx-reducing device, and a second oxygen concentration sensor of a binary type, which are sequentially arranged in an exhaust system of an internal combustion engine from upstream to downstream. This degradation-determining system determines degradation of the NOx-reducing device based on a time period from a time point the output from the first oxygen concentration sensor has changed to a value indicative of a rich air-fuel ratio after the mixture supplied to the engine was enriched, to a time point the output from the second oxygen concentration sensor has changed to a value indicative of a rich air-fuel ratio, and a degree of degradation of the three-way catalyst.

However, when the conventional valve timing control system and the degradation-determining system are employed in combination, the accuracy of the degradation determination is lowered. More specifically, if the target cam phase is changed depending on the rotational speed of the engine or load thereon, the actual cam phase is changed in accordance therewith, so that the valve overlap is changed. As a result, the charging efficiency is changed to change the intake air amount, which results in variation in the air-fuel ratio of the mixture supplied to the engine. Further, the cam phase is changed by the cam phase change mechanism, which is hydraulically controlled, and hence it takes time to converge the actual cam phase to the target cam phase, so that the air-fuel ratio varies or fluctuates over a long time period. On the other hand, the two conventional degradation-determining systems described above are both configured such that the degradation determination is carried out under the condition of the constant intake air amount and in the state of the air-fuel ratio being controlled to the predetermined ratio. Therefore, when the valve timing control and the degradation determination are carried out in parallel, the accuracy of thereof is lowered due to variation in the air-fuel ratio caused by changes in the intake air amount during execution of the degradation determination.

SUMMARY OF THE INVENTION

It is an object of the invention to provide a valve timing control system for an internal combustion engine, which is capable of properly controlling valve timing while maintaining the accuracy of degradation determination of an oxygen concentration sensor or an exhaust gas-purifying device.

To attain the above object, the present invention provides a valve timing control system for an internal combustion engine, for controlling valve timing by changing a cam phase which is a phase of at least one of an intake cam and an exhaust cam, relative to a crankshaft, the valve timing control system being used together with a degradation-determining system for performing degradation determination of at least one of an oxygen concentration sensor and an exhaust gas-purifying device each arranged in an exhaust system of the engine, in a state in which an air-fuel ratio of a mixture supplied to the engine is controlled to a predetermined state.

The valve timing control system according to the invention is characterized by comprising:

actual cam phase-detecting means for detecting an actual cam phase;

operating condition-detecting means for detecting operating conditions of the engine;

target cam phase-setting means for setting a target cam phase in dependence on the detected operating conditions of the engine;

control means for performing control such that the actual cam phase becomes equal to the target cam phase;

determination means for determining whether or not executing conditions for executing the degradation determination are satisfied; and target cam phase-restricting means for restricting a change in setting of the target cam phase in dependence on the detected operating conditions of the engine by the target cam phase-setting means, when the determination means has determined that the executing conditions for executing the degradation determination are satisfied.

According to this valve timing control system, the target cam phase is set in dependence on the operating conditions of the engine, and the actual cam phase is controlled to become equal to the target cam phase. Further, when it is determined that executing conditions for executing the degradation determination of the oxygen concentration sensor and/or the exhaust gas-purifying device by the degradation-determining system are satisfied, a change in setting of the target cam phase in dependence on the operating conditions of the engine is restricted. This suppresses the variation in the actual cam phase, and accordingly suppresses changes in the valve overlap and charging efficiency, whereby the changes in the intake air amount and resulting variation the air-fuel ratio can be suppressed. As a result, during execution of the degradation determination, the air-fuel ratio can be maintained in a predetermined state absolutely necessary for the accurate degradation determination, and therefore the degradation determination of the oxygen concentration sensor or the exhaust gas-purifying device can be carried out with accuracy.

Preferably, the target cam phase-restricting means sets the target cam phase to a fixed value.

According to this preferred embodiment, when it is determined that the executing conditions are satisfied, the target cam phase is set to a fixed value. This reduces variation in the actual cam phase, which sufficiently suppresses the variation in the air-fuel ratio. Therefore, the degradation determination can be carried out with high accuracy.

More preferably, the valve timing control system further includes a hydraulic pressure control valve that holds the cam phase in a most retarded value when the hydraulic pressure control valve is in stoppage, and is supplied with hydraulic pressure for operation to advance the cam phase, and the target cam phase-restricting means sets the fixed value to the most retarded value.

According to this preferred embodiment, in accordance with setting of the target cam phase to the most retarded value, the hydraulic pressure control valve is held in a mechanically-stable stoppage state in which no hydraulic pressure is supplied thereto. This makes it possible to hold the actual cam phase in a most stable state. As a result, the variation in the air-fuel ratio can be further positively suppressed, which enables the degradation determination to be carried out with even higher accuracy.

The above and other objects, features, and advantages of the invention will become more apparent from the following detailed description taken in conjunction with the accompanying drawings.

DETAILED DESCRIPTION OF PREFERRED EMBODIMENT

Figure 1:
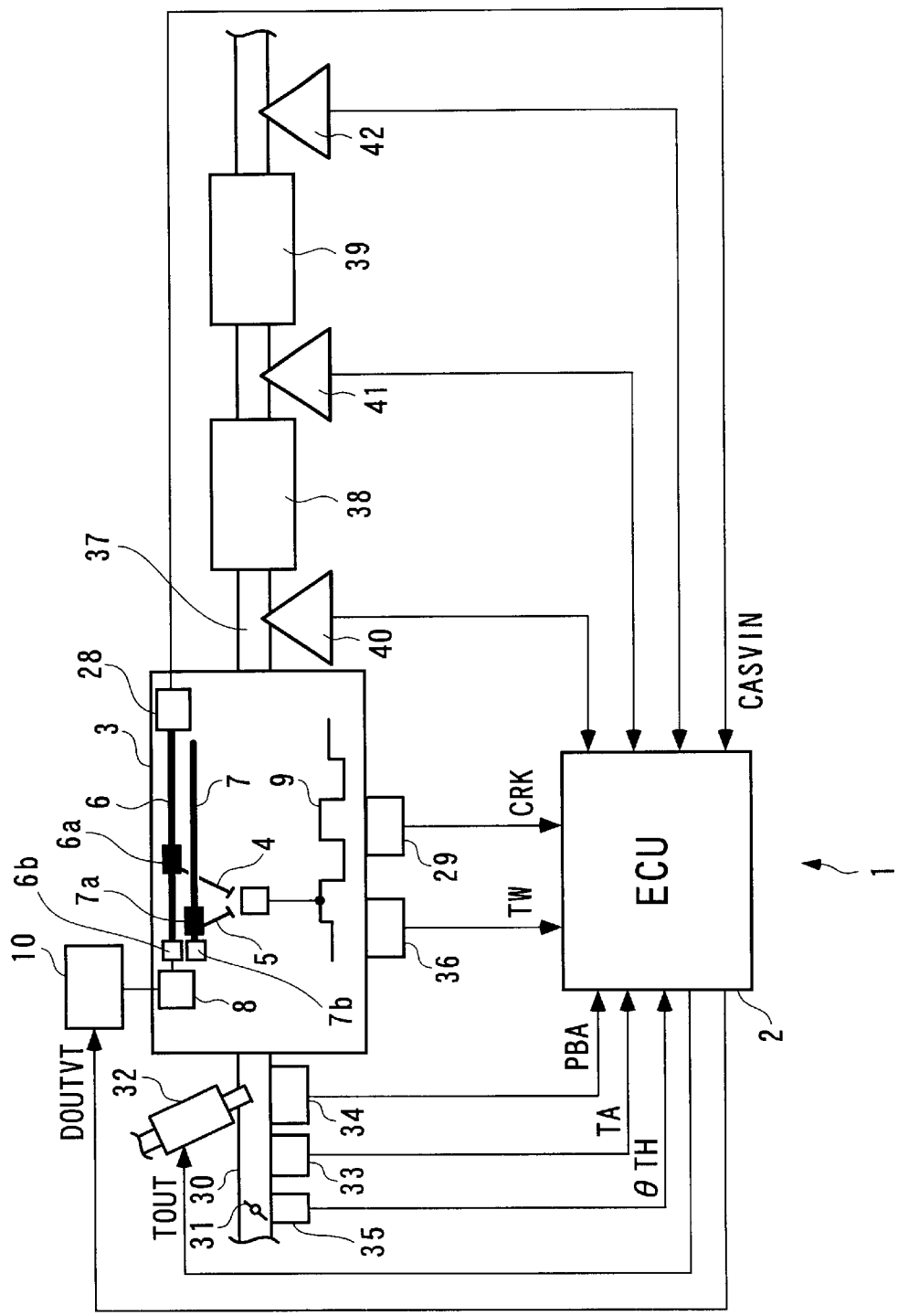
FIG. 1 is a block diagram schematically showing the arrangement of an internal combustion engine incorporating a valve timing control system according to an embodiment of the invention.

The invention will now be described in detail with reference to the drawings showing an embodiment thereof. Referring first to FIG. 1, there is schematically shown the arrangement of an internal combustion engine incorporating a valve timing control system according to an embodiment of the invention. As shown in the figure, the control system 1 includes an ECU 2 (degradation-determining system, actual cam phase-detecting means, operating condition-detecting means, target cam phase-setting means, control means, determination means, target cam phase-restricting means). The ECU 2 carries out control processes, described hereinbelow, in dependence on operating conditions of the internal combustion engine (hereinafter simply referred to as "the engine") 3.

The engine 3 is a four-stroke cycle DOHC (double overhead camshaft) gasoline engine, for example, which includes an intake camshaft 6 and an exhaust camshaft 7. The intake and exhaust camshafts 6, 7 are connected to a crankshaft 9 by their respective driven sprockets 6b, 7b, and a timing chain, not shown, for rotating through 360 degrees as the crankshaft 9 rotates through 720 degrees. The intake camshaft 6 is integrally formed with a plurality of intake cams 6a (only one of which is shown) for opening and closing respective intake valves 4 (only one of which is shown), and the exhaust camshaft 7 is integrally formed with a plurality of exhaust cams 7a (only one of which is shown) for opening and closing respective exhaust valves 5 (only one of which is shown).

Further, the intake camshaft 6 is rotatably connected to the driven sprocket 6b associated therewith such that the intake camshaft 6 can be rotated or turned within a range of a predetermined angle. By changing a relative angle of the intake camshaft 6 with respect to the driven sprocket 6b, the phase angle (hereinafter simply referred to as "the cam phase") CAIN of each intake cam 6a relative to the crankshaft 9 is changed to advance or retard the opening/closing timing (valve timing) of the intake valve 4. Arranged at one end of the intake camshaft 6 are a cam phase change mechanism (hereinafter referred to as "the VTC") 8 for controlling the cam phase CAIN, and an hydraulic pressure control valve 10

The VTC 8 includes an advance chamber, not shown, and a retard chamber, not shown, which are defined on opposite sides of a vane, not shown, integrally formed with the intake camshaft 6, and is configured such that hydraulic pressure from an oil pump, not shown, driven by the engine 3 is selectively supplied to the advance chamber or the retard chamber under control of the hydraulic pressure control valve 10 to thereby turn the intake camshaft 6 in an advancing direction or a retarding direction relative to the driven sprocket 6b.

The hydraulic pressure control valve 10 is formed by a duty solenoid valve which includes a solenoid, and a spool driven by a force generated by the solenoid, neither of which is shown. The hydraulic pressure control valve 10 is constructed such that the position of the spool thereof is continuously changed according to an output duty factor DOUTVT of solenoid current (pulse current) supplied to the solenoid, which is controlled by the ECU 2. The advance chamber or retard chamber of the VTC 8 is opened and closed depending on the position of the spool.

More specifically, when the output duty factor DOUTVT of the solenoid current to be supplied to the hydraulic pressure control valve 10 (hereinafter simply referred to as "the output duty factor DOUTVT") is larger than a hold duty factor value (e.g. 50%) for holding the cam phase, the spool of the hydraulic pressure control valve 10 is moved from its neutral position toward one side to open the advance chamber, whereby the hydraulic pressure is supplied to the advance chamber to place the VTC 8 in a state advancing the cam phase CAIN. On the other hand, when the output duty factor DOUTVT is smaller than the hold duty factor value, the spool is moved from its neutral position toward the other side to open the retard chamber, whereby the hydraulic pressure is supplied to the retard chamber to place the VTC 8 in a state retarding the cam phase CAIN. It should be noted that the intake cam 6a can be moved through 60 degrees crank angle, assuming 25 degrees crank angle BTDC when it is in the most retarded position and 85 degrees crank angle BTDC when it is in the most advanced position. The cam phase CAIN is 0 degrees crank angle when the intake cam 6a is in the most retarded position, and 60 degrees crank angle when the intake cam 6a is in the most advanced position.

Further, when the output duty factor DOUTVT is equal to the hold duty factor value, the hydraulic pressure control valve 10 is placed in a cam phase-holding state in which the spool thereof is located in the neutral position for simultaneously closing the advance chamber and the retard chamber. In this state, supply of the hydraulic pressure to the advance chamber and the retard chamber is cut off, and the intake camshaft 6 and the driven sprocket 6b are fixedly connected to each other, whereby the cam phase CAIN is held at a value to which it has been controlled by the VTC 8.

A cam angle sensor 28 (actual cam phase-detecting means) is arranged at the other end of the intake camshaft 6, opposite to the one end at which the VTC 8 is arranged. The cam angle sensor 28 is comprised e.g. of a magnet rotor and an MRE (magnetic resistance element) pickup, and detects a cam angle CASVIN of the intake cam 6a measured with respect to a TDC (top dead center) position, and delivers a signal indicative of the detected cam angle CASVIN to the ECU 2. Further, the crankshaft 9 has a crank angle position sensor 29 (operating condition-detecting means, actual cam phase-detecting means) arranged therefor. The crank angle position sensor 29 is constructed similarly to the above cam angle sensor 28, and delivers a CRK signal as a pulse signal to the ECU 2 whenever the crankshaft 9 rotates through a predetermined angle (e.g. 30 degrees). The ECU 2 calculates (detects) an actual cam phase CAIN based on the CRK signal and the CASVIN signal (hereinafter, the cam phase actually detected is referred to as "the actual cam phase CAIN") as required. Further, the ECU 2 determines an engine rotational speed NE based on the CRK signal.

Further, although not shown, the intake cams 6a and the exhaust cams 7a are each comprised of a low-speed cam, and a high-speed cam having a higher cam nose than that of the low-speed cam. Each of the intake and exhaust cams can be switched by a valve timing changeover mechanism (hereinafter referred to as "the VTEC") between the low-speed cam and the high-speed cam, whereby the valve timing of the intake valve 4 and exhaust valve 5 is changed between a low-speed valve timing (hereinafter referred to as "Lo. V/T"), and a high-speed valve timing (hereinafter referred to as "Hi. V/T") in which the amount of valve lift is made larger and charging efficiency is made higher than the Lo. V/T. Similarly to the VTC 8, the operation of the VTEC is also controlled by the ECU 2 which controls the hydraulic pressure supplied to the VTEC via a hydraulic pressure control valve, not shown.

The engine 3 has an intake pipe 30 in which is arranged a throttle valve 31 having a throttle valve opening sensor 35 (operating condition-detecting means) attached thereto. Further, injectors 32 (only one of which is shown), an intake air temperature sensor 33, and an intake air pressure sensor 34 (operating condition-detecting means) are inserted into the intake pipe 30 at respective locations downstream of the throttle valve 31. Each injector 32 has its fuel injection time period (fuel injection amount) TOUT controlled by a drive signal delivered from the ECU 2. It should be noted that the engine 3 is configured such that the operation thereof can be switched between a stoichiometric operation in which the combustion is performed with a mixture having a substantially stoichiometric air-fuel ratio and a lean-burn operation in which the combustion is performed with a mixture having a leaner air-fuel ratio than the stoichiometric one, and the switching therebetween is also controlled by the ECU 2.

The intake air temperature sensor 33 senses a temperature (intake air temperature TA) of intake air within the intake pipe 30 and supplies a signal indicative of the sensed intake air temperature TA to the ECU 2. The intake air pressure sensor 34 senses an absolute pressure PBA within the intake pipe 30 and supplies a signal indicative of the sensed absolute pressure PBA to the ECU 2. The throttle valve opening sensor 35 senses an opening degree θTH of the throttle valve 31 (hereinafter referred to as "the throttle valve opening θTH) and supplies a signal indicative of the sensed throttle valve opening θTH to the ECU 2. Further, an engine coolant temperature sensor 36 is mounted in the cylinder block of the engine 3. The engine coolant temperature sensor 36 senses a temperature (engine coolant temperature TW) of an engine coolant circulating through the cylinder block of the engine 3 and supplies a signal indicative of the sensed engine coolant temperature TW to the ECU 2.

In an exhaust pipe 37 (exhaust system) of the engine 3, there are sequentially arranged a three-way catalyst 38 and a NOx-reducing device 39 (exhaust gas-purifying device) from upstream to downstream. The three-way catalyst 38 has an oxygen storage capability and when the air-fuel ratio of the mixture supplied to the engine is set to a learner value than the stoichiometric one to produce lean exhaust gases containing a relatively high concentration of oxygen, the three-way catalyst 38 stores oxygen therein. On the other hand, when the air-fuel ratio of the mixture is set to a richer value than the stoichiometric one to produce rich exhaust gases containing much HC and CO content, the three-way catalyst 38 oxidizes the HC and CO by the oxygen stored therein. The NOx-reducing device 39 contains a NOx absorber (not shown) and a catalyst (not shown) for promoting oxidation and reduction. The NOx absorber absorbs NOx when the exhaust gases are lean, while when the same are rich, the NOx absorber releases NOx, which is reduced by HC and CO and emitted as a nitrogen gas, and at the same time, the HC and CO are oxidized and emitted as water vapor and carbon dioxide.

Further, a linear-type oxygen concentration sensor (hereinafter referred to as "the LAF sensor 40") is arranged in the exhaust pipe 37 at a location upstream of the three-way catalyst 38. The LAF sensor 40 delivers a detection signal approximately proportional to an oxygen concentration (air-fuel ratio) in exhaust gases to the ECU 2. Further, a first oxygen concentration sensor of a binary type (hereinafter referred to as "the first O2 sensor 41") and a second oxygen concentration sensor of a binary type (hereinafter referred to as "the second O2 sensor 42") are arranged in the exhaust pipe 37 at a location between the three-way catalyst 38 and the NOx-reducing device 39 and a location downstream of the NOx-reducing device 39, respectively. These O2 sensors 41, 42 have characteristics that their outputs sharply change when the air-fuel ratio of the exhaust gases changes across the stoichiometric air-fuel ratio, and signals output therefrom go high when the air-fuel ratio is richer than the stoichiometric air-fuel ratio and go low when the air-fuel ratio is leaner than the stoichiometric air-fuel ratio. The signals from these O2 sensors 41, 42 are delivered to the ECU 2.

The ECU 2 is formed by a microcomputer including an I/O interface, a CPU, a RAM, and a ROM, none of which are shown. The signals from the above sensors are each input to the CPU after A/D conversion and waveform shaping by the I/O interface.

The ECU 2 determines operating conditions of the engine 3 based on these signals, and in dependence on the determined operating conditions, carries out control of the VTC 8 (hereinafter referred to as "the VTC control") in the manner described hereinafter, according to a control program and data read from the ROM, and data read from the RAM, while performing degradation determination of the LAF sensor 40 and the NOx-reducing device 39.

Figure 2:
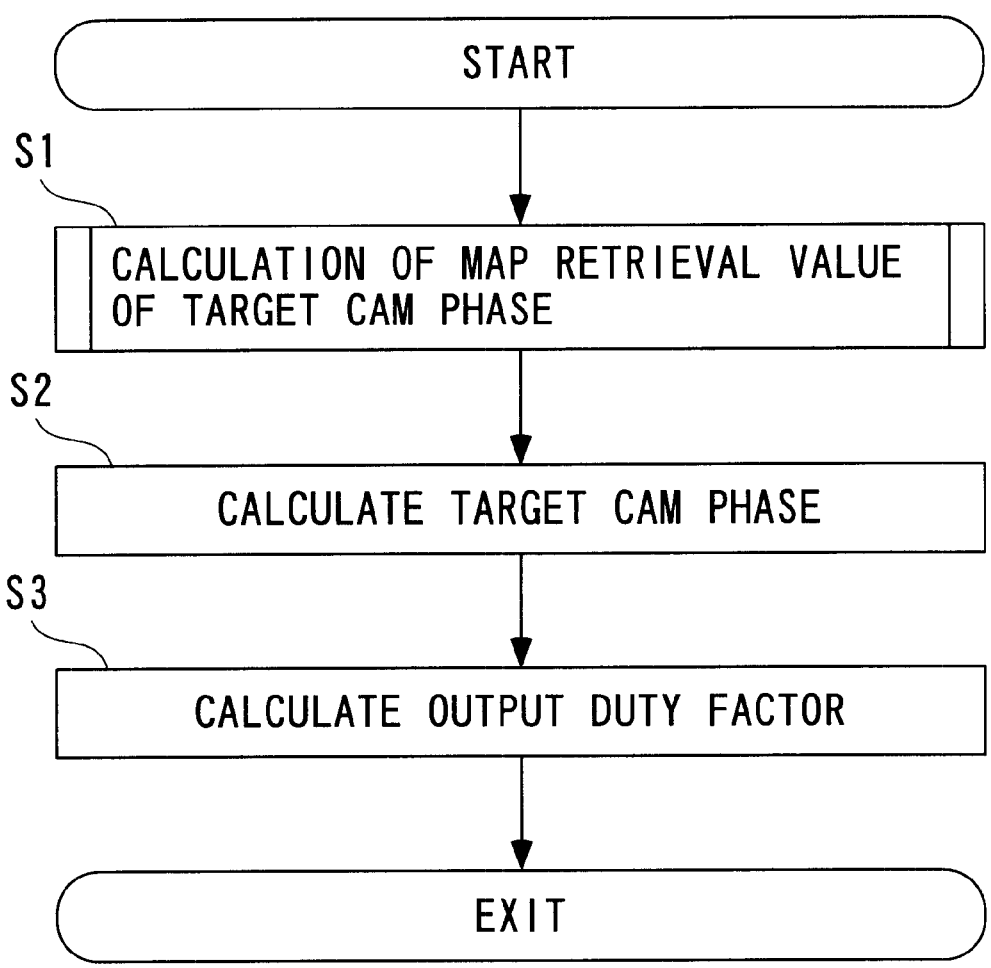
FIG. 2 is a flowchart showing a main routine of a VTC control process carried out by the FIG. 1 valve timing control system.

FIG. 2 is a flowchart showing a main routine of an overall control process for the above VTC control. This control process is executed at predetermined time intervals (e.g. every 10 milliseconds). First, in a step S1, a map retrieval value CAINCMDX of a target cam phase CAINCMD is calculated depending on operating conditions of the engine. Then, the target cam phase CAINCMD is calculated based on the calculated map retrieval value CAINCMDX (step S2). Next, according to the target cam phase CAINCMD and the actual cam phase CAIN, the output duty factor DOUTVT is calculated by feedback control such that the actual cam phase CAIN becomes equal to the target cam phase CAINCMD (step S3).

Figure 3:
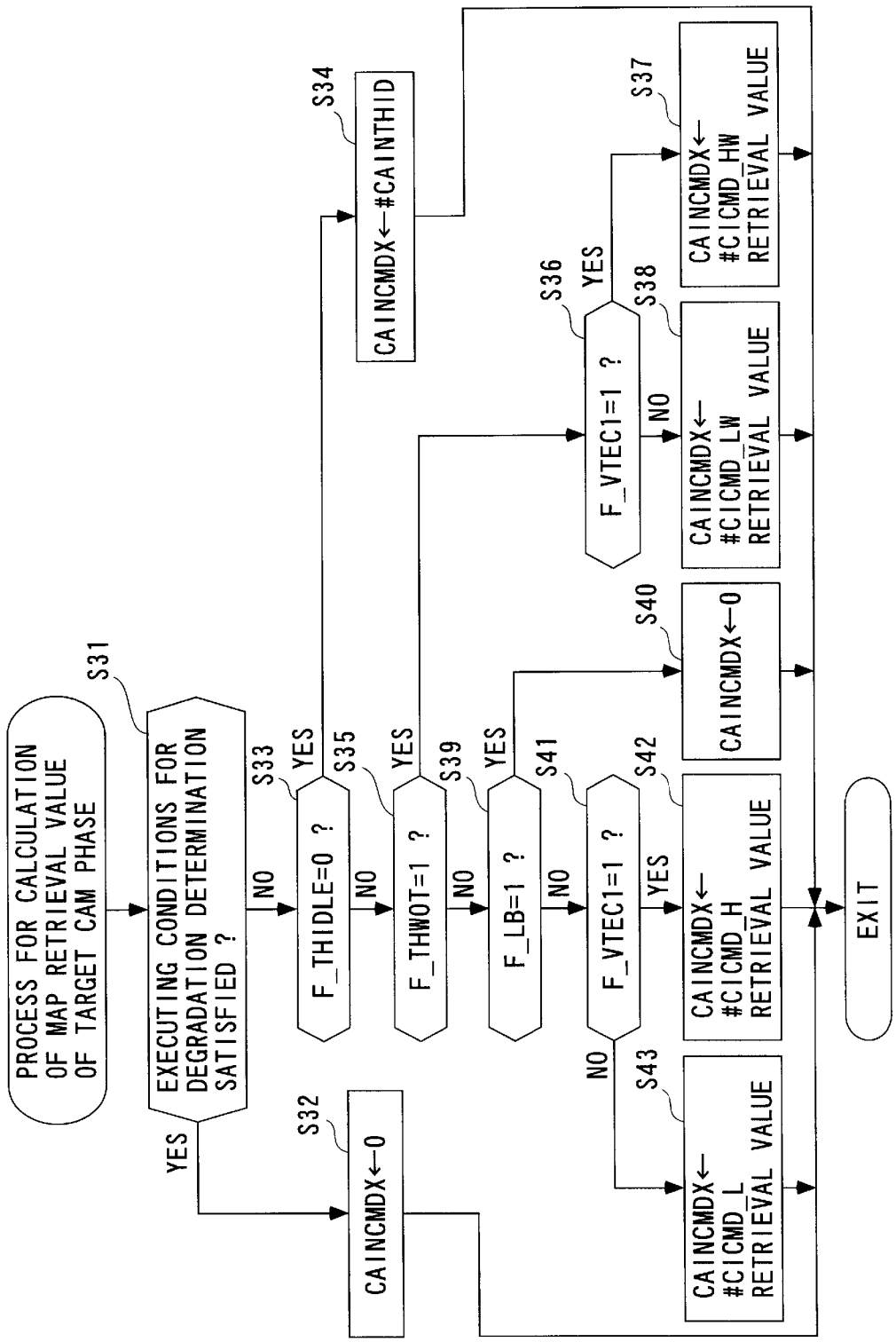
FIG. 3 is a flowchart showing a subroutine of the FIG. 2 main routine, for carrying out a process for calculating a map retrieval value of a target cam phase.

FIG. 3 is a subroutine for calculation of the map retrieval value CAINCMDX of the target cam phase CAINCMD, which is executed in the step S1 in the FIG. 2 main routine. First, in a step S31, depending on operating conditions of the engine, it is determined whether or not executing conditions for executing degradation determination of the LAF sensor 40 or the NOx-reducing device 39 are satisfied.

If the answer to the question of this step is affirmative (YES), i.e. if the executing conditions are satisfied, the map retrieval value CAINCMDX is set to a value of 0, i.e. the most retarded value (step S32), followed by terminating the present subroutine.

If the answer is negative (NO), i.e. if the conditions are not satisfied, it is determined in a step S33 whether or not a fully-closed throttle flag F_THIDLE assumes 0. If F_THIDLE=0 holds, i.e. if the throttle valve 31 is substantially fully closed, the map retrieval value CAINCMDX is set to a retarded fixed value #CAINTHID (corresponding e.g. to two degrees) which is close to the most retarded value (step S34), followed by terminating the present subroutine.

If the answer to the question of the step S33 is negative (NO), it is determined whether or not a wide-open throttle flag F_THWOT assumes 1 (step S35). If F_THWOT=1 holds, i.e. if the throttle valve 31 is substantially fully open, it is determined whether or not a valve timing flag F_VTEC1 assumes 1 (step S36). If F_VTEC1=1 holds, i.e. if the engine 1 is operating with the Hi. V/T (high-speed valve timing), a table value #CICMD_HW for the wide-open throttle Hi. V/T is retrieved from a table, not shown, and set to the map retrieval value CAINCMDX (step S37), followed by terminating the present subroutine. On the other hand, if F_VTEC1=0 holds in the step S36, i.e. if the engine 1 is operating with the Lo. V/T (low-speed valve timing), a table value #CICMD_LW for the wide-open throttle Lo. V/T is retrieved from a table, not shown, which is set separately from the above table, and set to the map retrieval value CAINCMDX (step S38), followed by terminating the present subroutine. These table values #CICMD_HW, #CICMD_LW are set according to the engine rotational speed NE and the throttle valve opening θTH with importance attached to torque.

If the answer to the question of the step S35 is negative (NO), i.e. if the throttle valve 31 is not substantially fully open, it is determined whether or not a lean-burn flag F_LB assumes 1 (step S39). If F_LB=1 holds, i.e. if the engine 3 is performing the lean-burn operation, the map retrieval value CAINCMDX is set to the most retarded value 0 (step S40), followed by terminating the present subroutine.

If F_LB=0 holds in the step S39, i.e. if the engine 3 is performing the stoichiometric operation, similarly to the step S36, the determination concerning the valve timing flag F_VTEC1 is carried out (step S41). If the engine 1 is operating with the Hi. V/T, a table value #CICMD_H for the non-wide-open throttle Hi. V/T is retrieved from a table, not shown, and set to the map retrieval value CAINCMDX (step S42), followed by terminating the program. On the other hand, if it is determined in the step S41 that the engine 1 is operating with the Lo. V/T, a table value #CICMD_L for the non-wide-open throttle Lo. V/T is retrieved from a table, not shown, which is set separately from the above table, and set to the map retrieval value CAINCMDX (step S43), followed by terminating the present subroutine. These map values #CIMD_H, #CIMD_L are set according to the engine rotational speed NE and the intake pipe absolute pressure PBA with importance attached to fuel economy.

Figure 4:
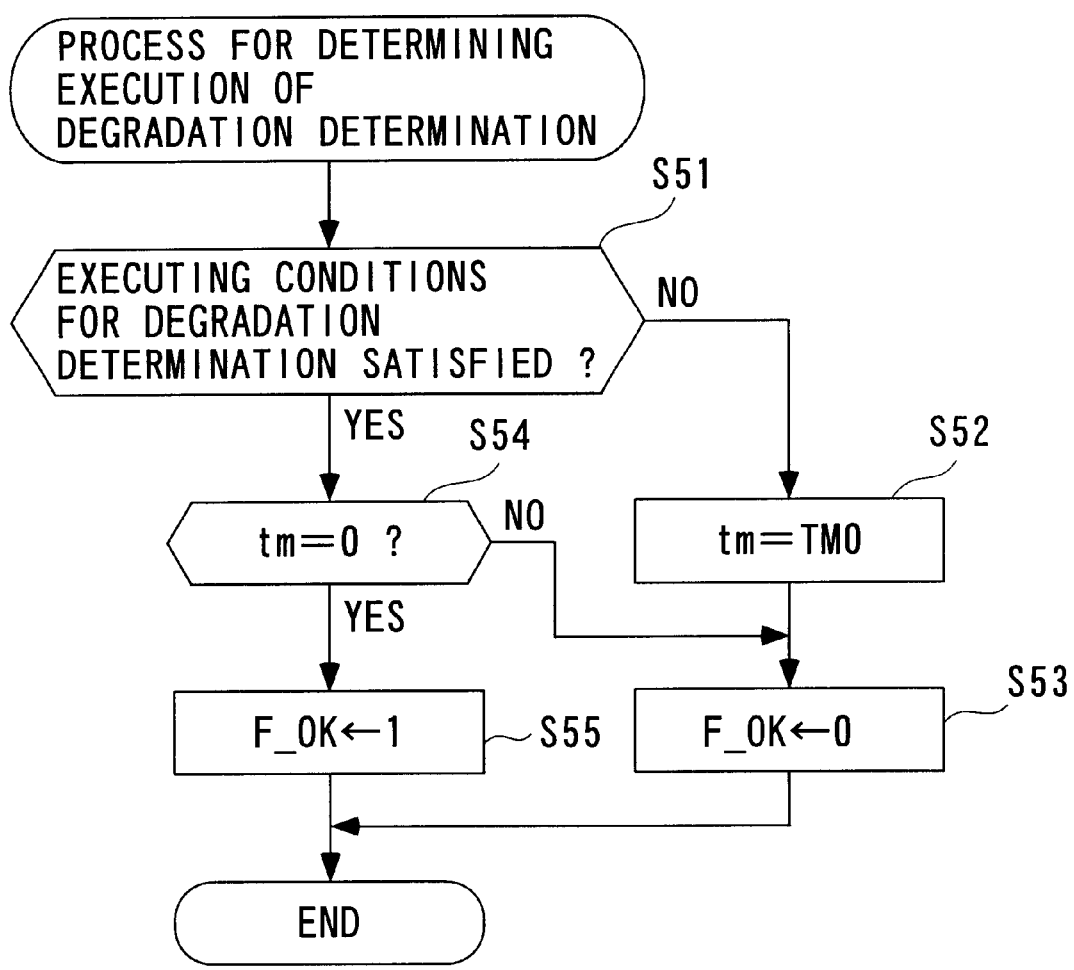
FIG. 4 is a flowchart showing a process for determining execution of degradation determination of a LAF sensor.

FIG. 4 is a flowchart for a process for determining execution of the degradation determination of the LAF sensor 40. First, in a step S51, it is determined whether or not the executing conditions for the degradation determination are satisfied. This determination is carried out based on the engine rotational speed NE and the intake pipe absolute pressure PBA. More particularly, the executing conditions are determined to be satisfied when the engine rotational speed NE is in a predetermined medium speed range, and the intake pipe absolute pressure PBA is in a predetermined medium load range, both in a relatively stable state, that is, when the engine is in a medium-engine rotational speed and medium-load operating region with a stable intake air amount.

If the answer to the question of the step S51 is negative (NO), a downcount timer tm is set to a predetermined time period TM0 (e.g. two seconds) (step S52), and then a degradation determination execution flag F_OK is set to 0 (step S53), followed by terminating the present program without permitting execution of the degradation determination. On the other hand, if the answer to the question of the step S51 is affirmative (YES), i.e. if the executing conditions for the determination are satisfied, it is determined whether or not the count of the timer tm set in the step S52 is equal to 0 (step S54). If the answer to this question is negative (NO), i.e. if the predetermined time period TM0 has not yet elapsed after the executing conditions were satisfied, the program proceeds to the step S53, thereby putting the execution on hold. If the answer to the question of the step S54 is affirmative (YES), i.e. if the count of the timer tm is equal to 0, that is, if the predetermined time period TM0 has elapsed after the executing conditions were satisfied, the degradation determination execution flag F_OK is set to 1 (step 55) to thereby permit execution of the degradation determination, followed by terminating the present program.

The degradation determination of the LAF sensor 40 is performed e.g. in the following manner: The ECU controls the fuel injection period TOUT of each injector 32 to thereby cause fixed amounts of fuel to be injected into the cylinders such that at least one of the cylinders is supplied with a mixture having a different air-fuel ratio from that of mixtures supplied to the other cylinders. Then, a first air-fuel ratio variation waveform calculated based on the fixed fuel injection amounts and a second air-fuel ratio variation waveform calculated based on the output from the LAF sensor 40 are compared with each other to determine whether the LAF sensor 40 has been degraded.

Further, although not shown, the degradation determination of the NOx-reducing device 39 is carried out, similarly to the case of the LAF sensor 40, that is, the executing conditions for the degradation determination are considered to be satisfied when the engine rotational speed NE is in a predetermined medium speed range, and the intake pipe absolute pressure PBA is in a predetermined medium load range, both in a relatively stable state, and when the predetermined time period TM0 has elapsed after the above executing conditions were satisfied, the degradation determination of the NOx-reducing is performed in a timing different from that of the degradation determination of the LAF sensor 40. The degradation determination of the NOx-reducing device 39 is carried out by causing the ECU 2 to control the fuel injection period TOUT of the injectors 32 such that an enriched mixture is supplied to the engine 3, and then performing determination based on a time period between a time point the output from the first O2 sensor 41 has changed to a value indicative of a rich air-fuel ratio and a time point the output from the second O2 sensor 42 has changed to a value indicative of a rich air-fuel ratio, and a degree of degradation of the three-way catalyst 38.

As described heretofore, according to the present embodiment, under the VTC control described above, when the executing conditions for the degradation determination of the LAF sensor 40 or the NOx-reducing device 39 are satisfied, the map retrieval value CAINCMDX is set to 0, whereby the target cam phase CAINCMD is set to the most retarded value. This suppresses changes in the intake air amount through suppression of variation in the actual cam phase CAIN during execution of the degradation determination, whereby the air-fuel ratio is maintained in a stable state absolutely necessary for the accurate determination of the degradation of the above devices, which makes it possible to carry out the degradation determination with accuracy. Further, since the target cam phase CAINCMD is fixed to the most retarded value, the hydraulic pressure control valve 10 is held in the mechanically-stable stoppage state in which no hydraulic pressure is supplied thereto, so that the actual cam phase CAIN can be held in the most stable state of the hydraulic pressure control valve 10. Further, the timer tm permits the execution of the degradation determination after waiting for the actual cam phase CAIN to positively reach the most retarded value after the executing conditions have been satisfied, which makes it possible to perform the degradation determination with high accuracy and reliability.

The present invention is by no means limited to the embodiment described above, but can be put into practice in various forms. For example, although in the above embodiment, the target cam phase CAINCMD is set to the most retarded value, this is not limitative, but the target cam phase CAINCMD may be set to a different fixed value other than the most retarded value. For example, the target cam phase CAINCMD may be set to the preceding value employed when the executing conditions for the degradation determination are satisfied. In this case, differently from the case of the target cam phase CAINCMD being set to the most retarded value, the degradation determination can be carried out immediately without waiting for the actual cam phase CAIN to converge to the target cam phase CAINCMD. Further, instead of setting the target cam phase CAINCMD to a fixed value, the target cam phase CAINCMD may be restricted by narrowing an applicable range thereof during execution of the degradation determination.

Further, although in the above embodiment, the VTC control is carried out on the intake cams 6a, this is not limitative, but in place thereof or in combination therewith, the cam phase of the exhaust cams 7a may be changed.

It is further understood by those skilled in the art that the foregoing is a preferred embodiment of the invention, and that various changes and modifications may be made without departing from the spirit and scope thereof.

What is claimed is:

1. A valve timing control system for an internal combustion engine, for controlling valve timing by changing a cam phase which is a phase of at least one of an intake cam and an exhaust cam, relative to a crankshaft, the valve timing control system being used together with a degradation-determining system that performs a degradation determination of at least one of an oxygen concentration sensor and an exhaust gas-purifying device each arranged in an exhaust system of the engine, in a state in which an air-fuel ratio of a mixture supplied to the engine is controlled to a predetermined state, the valve timing control system comprising:
   actual cam phase-detecting means for detecting an actual cam phase;
   operating condition-detecting means for detecting operating conditions of the engine;
   target cam phase-setting means for setting a target cam phase in dependence on the detected operating conditions of the engine;
   control means for performing control such that the actual cam phase becomes equal to the target cam phase;
   determination means for determining whether or not executing conditions for executing the degradation determination are satisfied; and
   target cam phase-restricting means for restricting a change in setting of the target cam phase in dependence on the detected operating conditions of the engine by said target cam phase-setting means, when said determination means has determined that the executing conditions for executing the degradation determination are satisfied.

2. A valve timing control system according to claim 1, wherein said target cam phase-restricting means sets the target cam phase to a fixed value.

3. A valve timing control system according to claim 1, further including a hydraulic pressure control valve that holds the cam phase in a most retarded value when said hydraulic pressure control valve is in stoppage, and is supplied with hydraulic pressure for operation to advance the cam phase, and
   wherein said target cam phase-restricting means sets the fixed value to the most retarded value.

* * * * *